United States Patent
Rolia

(10) Patent No.: US 7,062,558 B2
(45) Date of Patent: Jun. 13, 2006

(54) METHOD AND SYSTEM FOR ENABLING RESOURCE SHARING IN A COMMUNICATION NETWORK HAVING A PLURALITY OF APPLICATION ENVIRONMENTS

(75) Inventor: Jerome Rolia, Kanata (CA)

(73) Assignee: Hewlett-Packard Development, L.P., Houston, TX (US)

( * ) Notice: Subject to any disclaimer, the term of this patent is extended or adjusted under 35 U.S.C. 154(b) by 713 days.

(21) Appl. No.: 09/991,340

(22) Filed: Nov. 13, 2001

(65) Prior Publication Data

US 2003/0093528 A1 May 15, 2003

(51) Int. Cl.
*G06F 15/173* (2006.01)

(52) U.S. Cl. .................... 709/226; 709/224

(58) Field of Classification Search ............... 709/201, 709/224, 226, 223
See application file for complete search history.

(56) References Cited

U.S. PATENT DOCUMENTS

| | | | | |
|---|---|---|---|---|
| 6,003,079 A | * | 12/1999 | Friedrich et al. | 709/224 |
| 6,212,562 B1 | * | 4/2001 | Huang | 709/227 |
| 6,466,984 B1 | * | 10/2002 | Naveh et al. | 709/228 |
| 6,539,427 B1 | * | 3/2003 | Natarajan et al. | 709/224 |
| 6,691,148 B1 | * | 2/2004 | Zinky et al. | 709/201 |

* cited by examiner

*Primary Examiner*—Jason Cardone
*Assistant Examiner*—Minh-Chau Nguyen
(74) *Attorney, Agent, or Firm*—Richard P. Lange

(57) ABSTRACT

A method for enabling resource sharing in a communication network supporting a plurality of application environments. Specifically, one embodiment of the present invention discloses a method ensuring only sufficient computational resources are used by a multi-component system as needed to meet its service level objectives. A method is disclosed wherein quality of service is monitored at each component in a multi-component application environment. A metric characterizes quality of service for each component. The method determines whether the quality of service at each component meets an associated service level objective. The method then optimizes the number of computational resources in each of components in the application environment to satisfy service level objectives.

24 Claims, 5 Drawing Sheets

METHOD AND SYSTEM FOR ENABLING RESOURCE SHARING IN A COMMUNICATION NETWORK HAVING A PLURALITY OF APPLICATION ENVIRONMENTS

TECHNICAL FIELD

The present invention relates to the field of quality of service measurement and control in computer systems. More specifically, the present invention relates to resource sharing in a communication network having a plurality of application environments.

BACKGROUND ART

Application environments are characterized by one or more independent computer systems in one or more administrative domains that are loosely coupled by networks and cooperate to provide computing resources for a global application. The extent and capabilities of each administrative domain are usually determined by the network boundaries of each distinct supplier or service provider.

For example, to break down complexity for a web-based communication network, an application environment could comprise a multi-component system, where each component is an administrative domain. The components can include a web server component, an application component, a database component, among others. The application environment is descriptive of many web shopping systems, but is also applicable to local networks servicing specific business enterprises supporting a specific need, such as application environments set up specifically for processing payroll.

Previously, application environments were optimized according to a single and static condition, e.g., a peak load condition. As such, the application environment would be originally configured to ensure operation even under peak load conditions. In particular, each of the components of the application environment would be configured accordingly to contain the correct ratio of computational resources (e.g., CPUS, database storage resources, networking resources, etc.) as compared to the other components under peak load conditions. Moreover, the application environment would be optimized to contain the maximum number of computational resources.

As such, a specific problem in the prior art application network is that dedicated computational resources (e.g., computer processing units (CPUs), memory, etc.) would go unused thereby wasting usable computational resources. Since peak load conditions occur infrequently, the application environment was not configured to efficiently use its computational resources some of the time.

Another problem associated with the prior art is the inability of the application environment to easily meet changing demands or an increasing number of users. A change in focus or demand would necessarily change the optimization parameters for each of the components in the application environment. For example, in the web shopping scenario, if an application environment was originally configured to support shopping for appliances via a single image and text interface, the number of resources in the application environment would change if the focus of the application environment were subsequently changed to support shopping for appliances via a video and text interface. Also, if user demand shifted from supporting one line of products to a sudden demand for two or more lines of products, the number of resources in the application environment would necessarily have to change to support the new demand. In another scenario, the number of resources needed would also change if the focus of the application environment is changed, such as, when changing from an environment supporting retail to one supporting scientific research. Similarly, if the number of users increased beyond that envisioned under peak load conditions, the original configuration would be unable to handle the newer peak load conditions.

Thus, a need exists for ensuring efficient use of computational resources when meeting quality of service objectives in an application environment.

DISCLOSURE OF THE INVENTION

The present invention provides a method and system for enabling resource sharing in a communication network supporting a plurality of application environments. The present invention provides for measuring quality of service in an application environment to better meet overall quality of service objectives in a changing environment. In addition, the present invention provides for efficient use of computational resources (e.g., host computer, storage resources, networking resources, etc.) when meeting quality of service objectives in an application environment.

Specifically, one embodiment of the present invention discloses a method for ensuring only sufficient computational resources are used by a multi-component system as needed to meet its service level objectives. A method is disclosed wherein quality of service is monitored locally at each component in a multi-component application environment. A metric (e.g., response time metric) characterizes quality of service for each component. The method determines whether the quality of service at each component meets an associated service level objective. The method then optimizes the number of servers in each of the components in the application environment to satisfy service level objectives.

Another embodiment discloses a system for ensuring only sufficient computational resources are used in a multi-component system that is an application environment. A dynamic resource manager monitors quality of service for a particular application environment. Based on localized metrics that measure performance at each of the components of the application environment, the dynamic resources manager determines whether service level objectives are met. Component managers, one at each of the components, determines the metrics for the application environment and sends the metrics to the dynamic resource manager.

For each component, the dynamic resource manager compares the associated metric against an interval of the corresponding service level objective. A message to add at least one server is sent by the dynamic resource manager to the respective component manager when the metric does not meet the interval for that corresponding component. A message to remove at least one server in the component is sent by the dynamic resource manager to the respective component manager when the metric exceeds the interval for that corresponding component. No action is taken by the dynamic resource manager when the metric falls within the interval, indicating that the service level objective for that corresponding component is satisfactory.

These and other benefits of the present invention will no doubt become obvious to those of ordinary skill in the art after having read the following detailed description of the preferred embodiments which are illustrated in the various drawing figures.

BEST MODES FOR CARRYING OUT THE INVENTION

Figure 1:
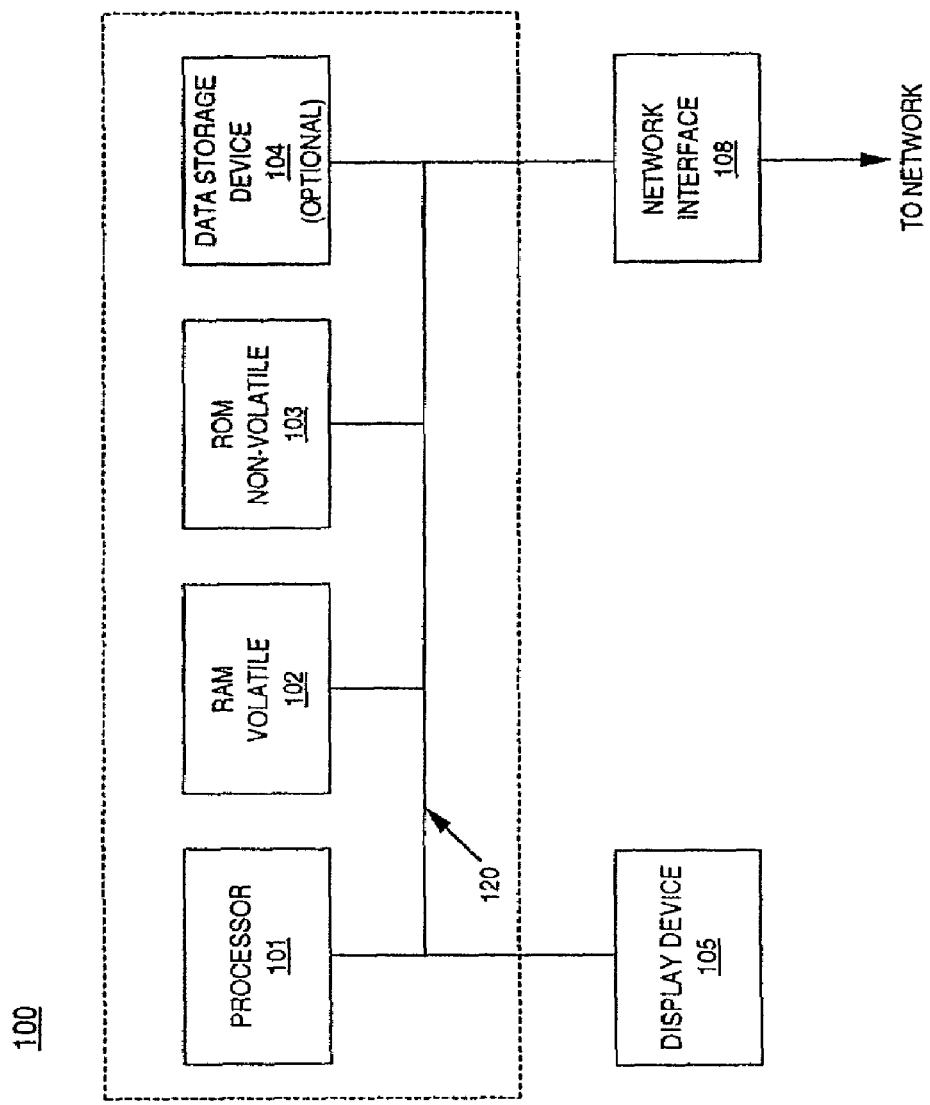
FIG. 1 illustrates a block diagram of an exemplary computer system that is capable of ensuring only sufficient computational resources are used by a multi-component system, in accordance with one embodiment of the present invention.

Reference will now be made in detail to embodiments of the present invention, a method for ensuring efficient use of computational resources in an application environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "processing," or "computing," or "translating," or "calculating," or "determining," or "scrolling," or "displaying," or "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, portions of the present invention are comprised of computer-readable and computer-executable instructions which reside, for example, in computer-readable media of an electronic system, such as, a dynamic resource manager, a component manager, a database server, and the like, in an application environment. FIG. 1 is a block diagram of interior components of an exemplary electronic system 100, upon which embodiments of the present invention may be implemented.

FIG. 1 illustrates circuitry of an exemplary electronic system 100. Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., memory card, hard drive, etc.) coupled with the bus 120 for storing information and instructions. Data storage device 104 can be removable. Exemplary electronic system 100 also contains an optional electronic display device 105 coupled to the bus 120 for displaying information to a user. The display device 105 utilized with the electronic system 100 may be a liquid crystal device, cathode ray tube (CRT), field emission device (FED, also called flat panel CRT) or other display device.

With reference still to FIG. 1, an optional signal Input/Output device 108 which is coupled to bus 120 for providing a communication link between electronic system 100 and a network environment is described. As such signal Input/Output device 108 enables the central processor unit 101 to communicate with or monitor other electronic systems or coupled to a communication network.

Resource Sharing in Application Environments

Accordingly, the present invention provides a method and system for enabling resource sharing in a communication network supporting a plurality of application environments. The present invention provides for measuring quality of service in an application environment to better meet overall quality of service objectives in a changing environment. In addition, the present invention provides for efficient use of computational resources when meeting quality of service objectives in an application environment.

Throughout the body of this Application, the term "computational resource" refers to resources such as, servers to include networking and database servers, host computers, database storage units, and the like.

Figure 2:
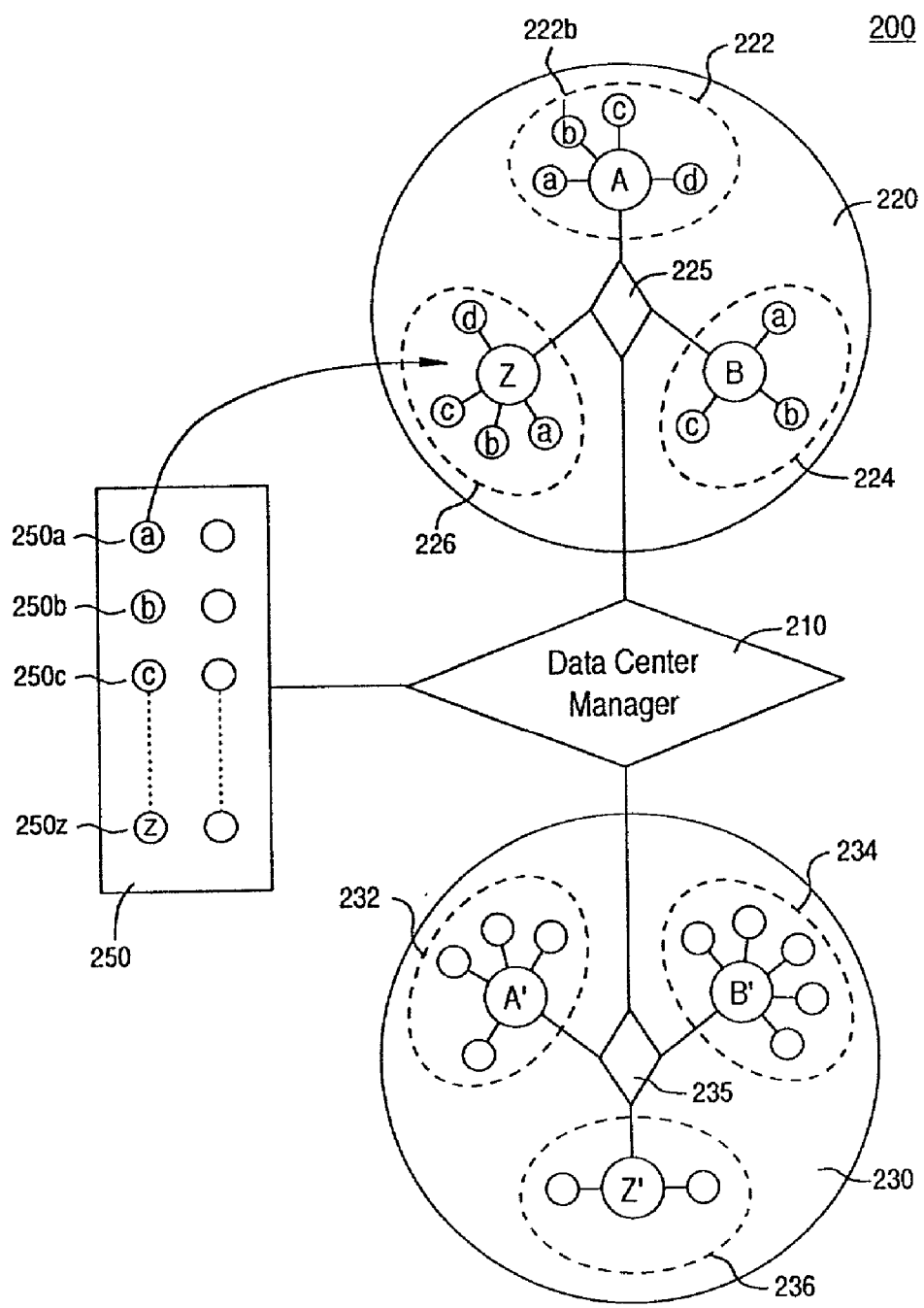
FIG. 2 illustrates a block diagram of a communication network having a plurality of application environments, in accordance with one embodiment of the present invention.

FIG. 2 illustrates a block diagram of an exemplary communication network 200 having a plurality of scalable, application environments, in accordance with one embodiment of the present invention. The network 200 is comprised of a plurality of computational resources each of which could be located in different geographical locations. In one embodiment, the network 200 is a data center that supports multiple application environments, each of which are scalable.

Combining computational resources together with permanent connections, e.g., via cable, or temporarily through telephone or other communication links, form individual networks having computational resources. The computational resources are distributed at nodes that could be located in different geographical locations. Further, computational resources in a particular network can be added or deleted, as necessary, to make the network scalable. An individual network comprised of various computational resources located on different nodes can support a particular application to form an application environment.

Exemplary communication network 200 shows two application environments 220 and 230 that operate independently from each other. However, FIG. 2 is for purposes of illustration only, and exemplary network 200 could handle any number of application environments. In addition, network 200 may be comprised of multiple networks that are conjoined or adaptively coupled for supporting one or more application environments. Each of the networks are arranged to support various applications, such as networking, storage, communications, and the like.

Referring back to FIG. 2, within each application environment, one or more administrative domains are provided, and hereinafter referred to as components. Each component is interconnected with at least one other component to form the application environment. In one embodiment, components are physically located in various networks in various geographical locations. In another embodiment, components are physically located in one electronic device (e.g., mainframe computer) that is partitioned into scalable, and flexibly sized virtual components.

For example, three components are interconnected to comprise application environment 220: component-A 222, component-B 224, and component-Z 226. Component-A 222 is comprised of computational resources at nodes 222a–d and is managed by a component manager-A at node 222A. Component-B 224 is comprised of computation resources at nodes 224a–c and is managed by a component manager-B at node 224B. Component-Z 226 is comprised of computational resources at nodes 226a–d and is managed by component manager-Z at node 226Z. A dynamic resource manager 225 manages the monitoring of quality of service throughout the application network 220.

Also, three components are interconnected to comprise application environment 230: component-A' 232, component-B' 234, and component-Z' 236. Component-A' 232 is comprised of computational resources located at four separate nodes. Component-B' 234 is comprised of computational resources located at five separate nodes. Component-Z' 236 is comprised of computational resources located at two separate nodes. A dynamic resource manager 235 manages the monitoring of quality of service throughout the application network 230.

Each of the nodes throughout an application environment contains a computational resource. In one embodiment, the resources may include a central processing unit, memory (e.g., storage units), Input/Output interface, such as, a keyboard and display and network connection interface. Computational resources can be further combined into the various components of an application environment. Each of the components are structured to perform a particular function. For example, an application environment may comprise, among others, a web server component for handling web related connections, an application component for processing the request, and a database component for maintaining and storing data.

In a virtual network environment, where the computational resources are connected through logical or virtual connections, an exemplary data center manager 210 coordinates the distribution and allocation of computational resources between the various independent virtual networks or application environments. In this way, physical computational resources that originally are assigned to one application environment at one particular time may be assigned to another application environment at another time. Also, the computational resource may change functionality from one environment to another. As such, efficient use of the computational resources can be accomplished. Network 200 may contain at any particular time a pool 250 of available computational resources (e.g., computational resources 250a–z and beyond) ready to be integrated into the various application environments supported by the network 200. The data center manager 210 communicates directly with each of the component managers in the network 200 to coordinate the allocation and removal of computational resources from those components.

Middleware applications allow for the different nodes in an application environment to recognize and communicate with each other. Advances in middleware allow for the formation of scalable virtual networks (e.g., an application environment) that can expand and contract. The expansion and contraction occurs transparently to the user of the application environment. For example, the addition of a computational resource to an application environment requires that each of the components and various nodes in those components in the application environment recognize the new computational resource in order to fully utilize the new resources in supporting the application. In this way, the data center (e.g., network 200) that supports multiple application environments can be provisioned for peak loads, instead of having each application environment (e.g., environment 220 or 230) individually provisioned for peak loads.

Middleware applications implement the necessary application programming interfaces to integrate the new computational resource into the application environment. As such, a new computational resource that is added to a database component is recognized by the application component and the other components of the application environment and vice versa. Similarly, middleware allows for the seamless and transparent removal of computational resources from an application environment.

For example, application environment 220, to meet increased user demand, may require the integration of an available server 250a from the pool 250 of available servers. The server 250a may be added to component-Z 226. Middleware allows for communication between the component manager-Z at node 226Z of environment 220 and the data center manager 210 to coordinate the assignment of server 250a to component-Z 226 at a node 226e (not shown).

Middleware allows for the further integration of server 250*a* into the application environment 220 as a whole.

For purposes of the present Application, a method for determining local and remote service level objectives is described in U.S. Pat. No. 6,003,079, SYSTEM AND METHOD FOR CONTINUOUSLY MEASURING QUALITY OF SERVICE IN A FEDERATED APPLICATION ENVIRONMENT, to Friedrich, et al. that is herein incorporated by reference as background material.

Performance for each of the distributed components in an application environment can be measured using quality of service metrics. Quality of service (QOS) performance for each component can be identified and diagnosed based on information obtained by the metrics. The performance measuring QOS can occur over a specific interval based on time, data collected, etc. For purposes of this Application, a performance metric is a unit of measurement for obtaining and analyzing the levels of the quality of service and performance received.

In one embodiment, quality of service objectives for an application environment can be broken down into local and remote service level objectives based on response-time metrics measured for local and remote performance at each node, in accordance with one embodiment of the present invention.

For each node, performance can be measured as local performance and remote performance, in accordance with one embodiment of the present invention. Local performance can be a measure of processing time on the local node in an application environment. For example, local performance can be a measure of service demand and queuing time for access to local host resources at the local node (e.g., time waiting for access to the local CPU, time spent accessing memory, time spent accessing I/O interface, etc.). Remote performance is a measure of all remaining processing time that is not on the local node in the application environment. For purposes of this Application, metrics are used to identify performance measurement characterizing quality of service both in the local and remote components.

As a function of service performance as measured by metrics, local service level objectives can be defined for each of the components of an application environment. As a conglomerate, a global service level objective for the entire application environment can be designed by combining each of the local service level objectives.

Figure 3:
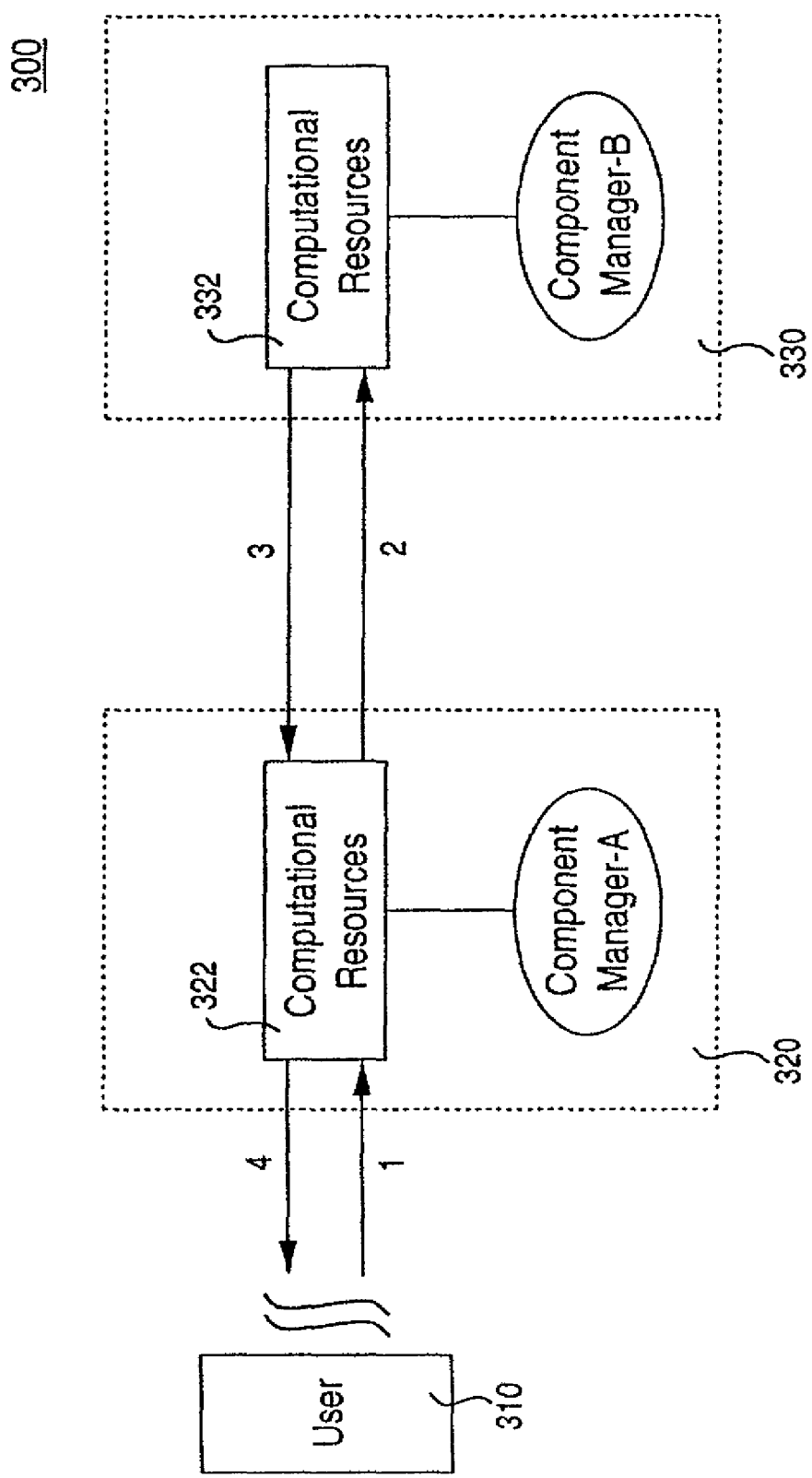
FIG. 3 is a data flow diagram illustrating local and remote service level objectives, in accordance with one embodiment of the present invention.

FIG. 3 is a data flow diagram for processing a user request at an application environment 300 having two components, and illustrates measurement of local and remote performance of service. In FIG. 3, component-A 320 is defined as the local component. In step 1, a generalized user request comes into the application environment 300 and is received at computational resources 322 located at component-A 320. By way of example, the request may be an order request for goods or services over a web shopping network. The local component-A 320 may be the web server component which creates the connection between the user 310 and the application environment 300.

Local resources are utilized to process the request at component-A 320. For example, CPU and memory may be used at one of the computational resources 322 in component-A 320. Time and resources spent establishing the connection and utilizing resources at the local component-A 320 are defined as local performance of service.

In step 2 of FIG. 3, the processing of the request then flows to component-B 330 in the application environment 300 and is received at a computational resource 332 associated with the remote component-B 330. The remote component-B 330 may comprise the application servers for performing the data manipulation of the request (e.g., processing an order request for goods). At this point a remote performance of service is measured in reference to the local performance measured at component-A 320. Performance of service at the local component-A 320 is suspended.

Computational resources are utilized to process the request at component-B 330. For example, CPU and memory may be used at one of the computational resource 332 in component-B 330 (e.g., to process an order request for goods in a web shopping environment).

In step 3, the reply from the computational resource 332 at remote component-B 330 (e.g., a confirmation of the order request) is sent back to the computational resource 322 at the local component-A 320. At this point, remote service processing is complete or suspended as resources at the local component-A 320 are used to send the reply back to the user 310, as illustrated in step 4.

As a result, for a particular I/O operation, performance of the application environment can be broken down into local and remote processing times for each of the components in the application environment. Elapsed time, or an end-to-end processing time in reference to a particular local component is equal to the sum of the local processing time plus the remote processing time of a particular operation, such as, processing a request.

Figure 4:
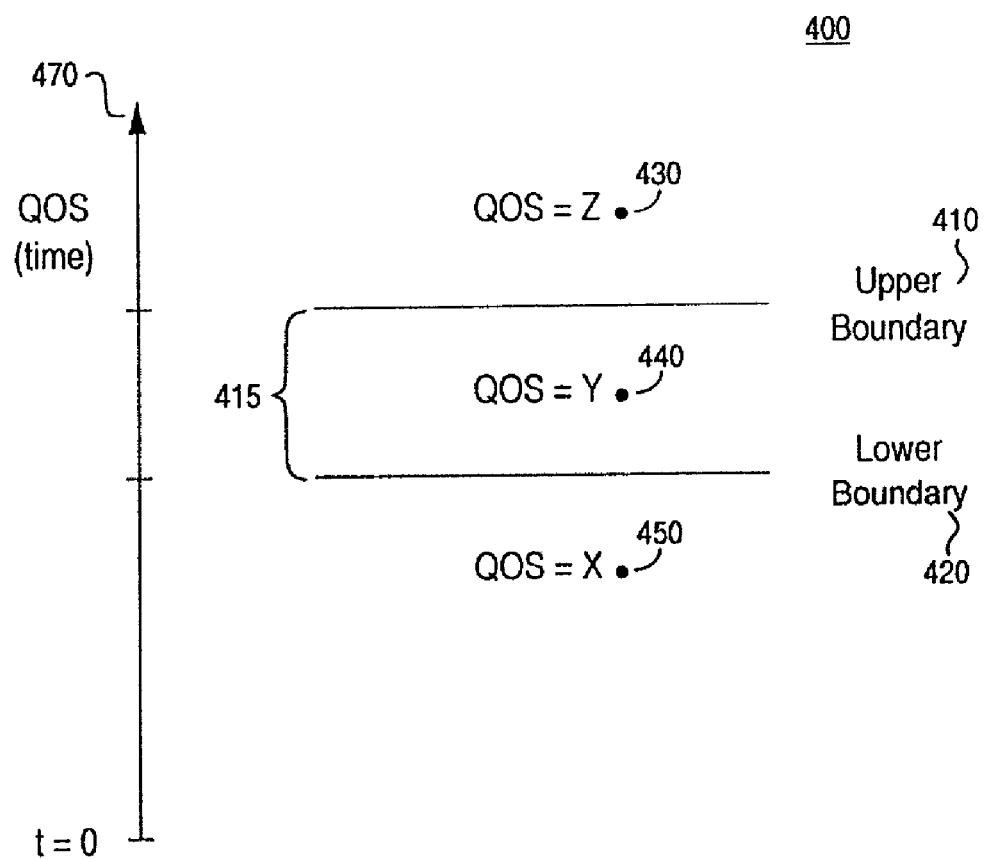
FIG. 4 is a graphical representation of intervals for a service level objective in relation to metrics that are measured as a function of time, in accordance with one embodiment of the present invention.

FIG. 4 is a graphical representation of the threshold boundaries that define an interval for a local service level objective, in accordance with one embodiment of the present invention. The graph 400 illustrates a response-time metric that measures performance of service (quality of service) at a local component of an application environment, in accordance with one embodiment of the present invention. In the present embodiment, the response-time metric is a measurement of time spent using resources at the local component in processing a request or requests along the y-axis 470. Other embodiments of the present invention are well suited to metrics that measure performance or quality of service, such as, utilization, throughput, etc.

A service level objective can be defined for the local component and is represented by the upper and lower boundaries 410 and 420 respectively. The service level objective can be represented as an interval 415 as defined by the upper and lower boundaries 410 and 420 respectively. The upper boundary represents the maximum amount of time that can be spent processing at the local component for a particular data interval (e.g. a processing a single request) while still satisfying the service level objective. The lower boundary represents a minimum amount of time needed that is spent processing at the local component for that particular data interval.

Going below the lower boundary exceeds the service level objective indicating too many computational resources are being utilized at that component. For example, referring back to FIG. 2, if the response time metric for component-A 222 indicates that too many computation resources are being utilized, then the component manager-A (e.g., manager 222A of FIG. 2) may decide to remove the computational resource-c 222*c* in component 222.

Defining a service level objective at the local component provides a benchmark for ensuring an adequate number of computation resources are used at this particular local component are utilized. As long as the right number of computational resources are assigned to the local component, its associated service level objective will be satisfied.

Point-Z 430 in FIG. 4 shows that the response-time metrics characterizing local performance of service do not satisfy the service level objective. Point-Z 430 indicates that too much time is spent on processing at the local component for the particular data interval. As such, point-Z 430 exceeds the interval 415 as set by the upper and lower boundaries 410 and 420, respectively. Exceeding the interval 415 indicates that computational resources need to be added to the local component.

Conversely, point-X 450 in FIG. 4 shows that the response-time metrics characterizing local performance of service exceed the service level objective. Point-X 450 indicates that too little time is spent on processing at the local component for the particular data interval. As such point-X 420 falls short of the interval 415 as set by the upper and lower boundaries 410 and 420, respectively. Falling short of the interval 415 indicates that computational resources needed to be removed from the local component. The removed computational resources can be utilized in other application environments that are not meeting their service level objectives.

In this way, by satisfying the interval 415, only sufficient computational resources are used at the local component. By following the service level objectives at each of the components of an application environment, this ensures only sufficient computational resources are used by the multi-component application environment as needed to met its service level objectives. Furthermore, by ensuring only sufficient amounts of computational resources are used in satisfying service level objectives, pools of unused resources can be created and made available for sharing by other application environments that need those available resources.

Figure 5:
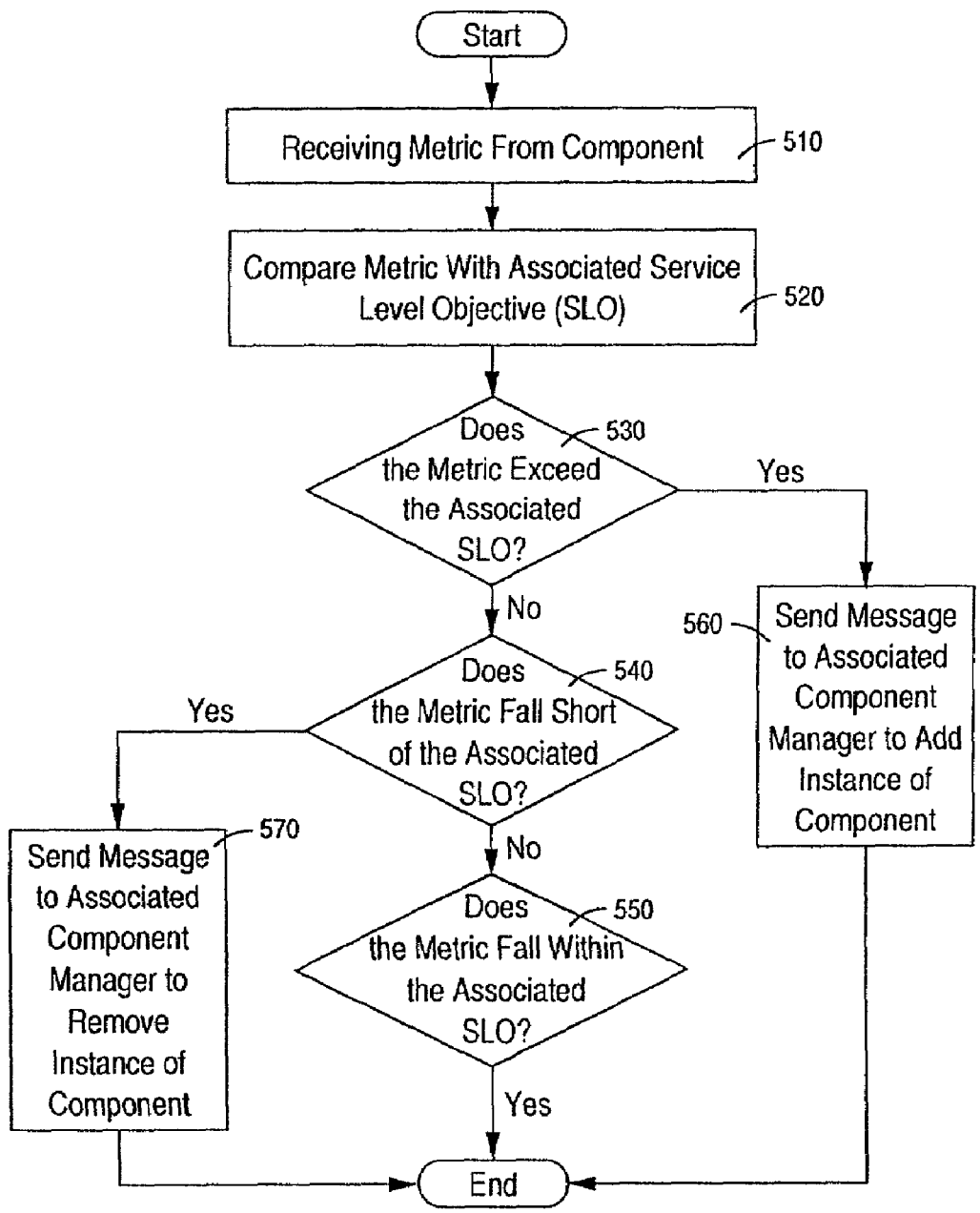
FIG. 5 is a flow diagram illustrating steps in a method for ensuring efficient use of computational resources in an application environment, in accordance with one embodiment of the present invention.

FIG. 5 is a flow diagram 500 illustrating steps in a method for ensuring resource sharing of computational resources among a plurality of application environments, in accordance with one embodiment of the present invention. The present embodiment exploits service level objectives to limit the capacity of resources associated with application environments.

The present embodiment exploits a feedback loop that compares and analyses measures of local performance of service against service level objectives. By focusing on local service level objectives, the behavior of each component is decoupled from the behavior of the other components in the application environment. This permits the capacity of the computational resources associated with each component to fluctuate according to demands on the application environment. As such, the application environment can change over time and ensures that only sufficient computational resources are allocated as needed to meet service level objectives. Application environments are constantly changing due to fluctuations in user demand, a change in the kinds of work being performed in that environment, among others.

The present embodiment implements the method of flow chart 500 in a system similar to the exemplary communication system 200 of FIG. 2. The present embodiment receives metrics from one of a plurality of components, a particular component, in an application environment, in step 510. The metrics can be standardized quality of service metrics as measured by a component manager at the particular component, such as, response-time metrics. The component manager is responsible for sending the metric to a dynamic resource manager on a design specific periodic basis. The component manager can also send the metric upon a request for such from the dynamic resource manager, in accordance with another embodiment of the present invention. The dynamic resource manager may be located on an independent node of the application environment.

The particular component has an associated service level objective along with a corresponding interval. The present embodiment, in step 520, at the dynamic resource manager, compares the metric received against the associated service level objective and corresponding interval.

In step 530, the intelligence located at the dynamic resource manager is able to determine whether the metric satisfies the corresponding service level objective. If the metric exceeds a corresponding interval, then the flow chart 500 proceeds to step 560. In other words, if the metric exceeds the upper boundary of the interval, then the service level objective is not satisfied.

In step 560, the dynamic resource manager sends a message to the particular component in question to add an instance or replicate of the component. In other words, the message sent indicates at least one of a computational resource, e.g., a server, needs to be added to the particular component. The component manager receives the message and using its own resources, communicates with the data center manager to allocate and integrate an available server from one of its server pools to the particular component.

Referring back to step 530, if the metric does not exceed the corresponding interval, then flow chart 500 proceeds to step 540. In step 540, the present embodiment has the intelligence at the dynamic resource manager to determine whether the metric satisfies the corresponding service level objective. If the metric falls short of the corresponding interval, then the flow chart 500 proceeds to step 570. In other words, if the metric falls below the lower boundary of the interval, then the service level objective is exceeded.

In step 570, the dynamic resource manager sends a message to the particular component in question to remove an instance or replicate of the component. In other words, the message sent indicates at least one of a computational resource, e.g., a server, that is assigned to the component needs to be removed from the particular component. The component manager receives the message and using its own resources, communicates with the data center manager to remove an available server and allocate it to one of the pools of available servers in the communication system.

Referring back to step 540, if the metric does not fall short of the corresponding interval, then flow chart 500 proceeds to step 550. In step 550, the present embodiment has the intelligence at the dynamic resource manager to determine whether the metric satisfies the corresponding service level objective. If the metric falls within the corresponding interval, indicating that the service level objective was satisfied, then no further action is necessary for that particular component and the process in flow chart 500 ends.

The process in flow chart repeats itself with every receipt of a metric at the dynamic resource manager associated with an application environment. As such, the method outlined in flow chart 500 is able to process and analyze multiple metrics received at a dynamic resource manager for an application environment containing multiple components. In this way, the present embodiment ensures that only sufficient computational resources are used to meet service level objectives for each of the components in an application environment.

While the methods of embodiments illustrated in flow chart 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for enabling resource sharing in a network having a plurality of application environments, is thus described. While the present invention has been described in particular embodiments, it should be appreciated that the present invention should not be construed as limited by such embodiments, but rather construed according to the below claims.

What is claimed is:

1. In a communication network having a plurality of computational resources for servicing a plurality of application environments, a method for enabling resource sharing, comprising:
    a) monitoring quality of service provided from a plurality of components coupled together in a first application environment supporting a first application;
    b) determining on an individual basis whether a plurality of service level objectives are satisfied, each of said plurality of service level objectives associated with one of said plurality of components, wherein each of said plurality of service level objectives is measured over a corresponding interval locally at a corresponding component without influence from the behavior of other components; and
    c) determining and providing the number of computational resources from said plurality of computational resources in each of said plurality of components in order to satisfy said plurality of service level objectives.

2. The method for enabling resource sharing as described in claim 1, wherein a) comprises:
    a1) determining a plurality of metrics, each of said plurality of metrics characterizing quality of service for a particular component in said plurality of components;
    a2) sending said plurality of metrics to a dynamic resource manager.

3. The method for enabling resource sharing as described in claim 2, wherein b) comprises:
    b1) at said dynamic resource manager, comparing each of said plurality of metrics to an associated service level objective in said plurality of service level objectives, each of said plurality of service level objectives associated with one of said plurality of components; and
    b2) determining whether each of said plurality of metrics fall within an associated interval for said associated service level objective.

4. The method for enabling resource sharing as described in claim 3, wherein c) comprises:
    sending a message to one of said plurality of components having a corresponding service level objective and corresponding interval to add at least one available computational resource from said plurality of computational resources when an associated metric exceeds said corresponding interval.

5. The method for enabling resource sharing as described in claim 3, wherein c) comprises:
    sending a message to one of said plurality of components having a corresponding service level objective and a corresponding interval to remove at least one computational resource, a removed computational resource, in said plurality of computational resources that are assigned to said one of said plurality of components when an associated metric falls short of said corresponding interval, thereby freeing up said removed computational resource for a second application supported by a second application environment in said communication network.

6. The method for enabling resource sharing as described in claim 3, wherein c) comprises:
    perform no action, if, at said dynamic resource manager, one of said plurality of metrics, that is associated with a corresponding component in said plurality of components and associated with a corresponding interval for an associated service level objective, meets said corresponding interval.

7. The method as described in 1, wherein said plurality of components are flexibly sized partitions of an electronic device.

8. The method for enabling resource sharing as described in claim 1, wherein b) comprises:
    determining each of said plurality of service level objectives.

9. The method for enabling resource sharing as described in claim 2, wherein each of said plurality of metrics is a response-time metric.

10. In a communication network having a plurality of computational resources for supporting a plurality of application environments, a method for enabling resource sharing, comprising:
    a) receiving a first response-time metric from a first component in a plurality of components that form a first application environment in said plurality of application environments;
    b) comparing said first response-time metric to a first service level objective associated with said first component, wherein said first service level objective is measured over an interval without influence from the behavior of other components; and
    c) determining and providing the number of computational resources in said plurality of computational resources that are assigned to said first component in order to satisfy said first service level objective.

11. The method for enabling resource sharing as described in claim 10, wherein b1) further comprises:
    determining whether said first response-time metric falls within a first interval for said first service level objective in order to satisfy said first service level objective.

12. The method for enabling resource sharing as described in claim 11, further comprising:
    if said first response-time metric exceeds said first interval, sending a first message to a first component manager associated with said first component to add at least one available computational resource in said plurality of computational resources;
    if said first response-time metric falls below said first interval, sending a second message to said first component manager to remove at least one computational resource in said plurality of computational resources that is assigned to said first component; and
    perform no action, if said first response-time metric falls within said first interval.

13. The method for enabling resource sharing as described in claim 10, further comprising:
    d) receiving a second response-time metric from a second component in said plurality of components;
    e) comparing said second response-time metric to a second service level objective associated with said second component;
    f) determining whether said second response-time metric falls within a second interval for said second service level objective; and
    g) optimizing the number of computational resources in said plurality of computational resources that are assigned to said second component in order to satisfy said second service level objective.

14. The method for enabling resource sharing as described in claim 13, further comprising:

if said second response-time metric exceeds said second interval, sending said first message to a second component manager associated with said second component;

if said second response-time metric falls below said second interval, sending said second message to said second component manager; and perform no action, if said second response-time metric falls within said second interval.

15. The method for enabling resource sharing as described in claim 10, further comprising:

at said first component, determining said first response-time metric, said first response-time metric characterizing quality of service for said first component; and sending said first response-time metric to said dynamic resource manager.

16. A communication network comprising:

a plurality of computational resources;

an application environment having a plurality of network nodes coupled together;

a plurality of components in said application environment servicing an application, each of said plurality of components comprising at least one computational resource from said plurality of computational resources, each of said plurality of components residing on one of said plurality of network nodes; and a dynamic resource manager residing coupled to said application environment for determining and providing the number of computational resources from said plurality of computational resources in each of said plurality of components in order to satisfy quality of service objectives for said application, wherein each of said quality of service objectives is measured over a corresponding interval locally at a corresponding component without influence from the behavior of other components.

17. The communication network as described in claim 16, further comprising:

a plurality of metrics, one for each of said plurality of components for measuring quality of service levels provided at each of said plurality of components, said plurality of metrics monitored by a plurality of component managers, one for each of said plurality of components.

18. The communication network as described in claim 17, wherein said plurality of service level objectives further comprise:

a plurality of intervals, each of said plurality of intervals associated with one of said plurality of service level objectives, each of said plurality of intervals defining satisfactory ranges of metrics;

an upper boundary for each of said plurality of intervals, wherein metrics exceeding said upper boundary are unacceptable, requiring additional resources or computational resources at the associated node;

a lower boundary for each of said plurality of intervals, wherein metrics falling below said lower boundary indicate quality of service is exceeded, requiring removal of resources or computational resources at the associated node.

19. The communication network as described in claim 17, further comprising:

an add message, said add message created by said dynamic resource manager when a metric for an associated component exceeds an associated interval, said add message sent from said dynamic resource manager to said associated component.

20. The communication network as described in claim 17, further comprising:

a remove message, said remove message created by said dynamic resource manager when a metric for an associated component falls below an associated interval, said remove message sent from said dynamic resource manager to said associated component.

21. The communication network as described in claim 16, further comprising:

a plurality of component managers, each of said plurality of component manager monitoring quality of service levels in one of said plurality of components, and for managing the addition and removal of computational resources in said one of said plurality of components in response to notices from said dynamic resource manager.

22. The communication network as described in claim 17, wherein said plurality of metrics is a plurality of response-time metrics.

23. The communication network as described in claim 16, wherein said quality of service objectives further comprise:

a plurality of service level objectives, each of said plurality of service level objectives associated with one of said plurality of components, each of said plurality of service level objectives characterizing quality of service levels for a particular component in said plurality of components.

24. The communication network as described in claim 16, further comprising:

a second application environment supporting a second application.

* * * * *

UNITED STATES PATENT AND TRADEMARK OFFICE
CERTIFICATE OF CORRECTION

PATENT NO. : 7,062,558 B2
APPLICATION NO. : 09/991340
DATED : June 13, 2006
INVENTOR(S) : Jerome Rolia It is certified that error appears in the above-identified patent and that said Letters Patent is hereby corrected as shown below:

On the face page, in field (73), in "Assignee", in column 1, line 1, after "Development" insert -- Company --.

In column 12, line 9, in Claim 7, after "in" insert -- claim --.

Signed and Sealed this

Fourth Day of May, 2010

David J. Kappos
*Director of the United States Patent and Trademark Office*